(12) United States Patent
Nakatani et al.

(10) Patent No.: US 8,050,639 B2
(45) Date of Patent: Nov. 1, 2011

(54) MULTI-ANTENNA COMMUNICATION APPARATUS

(75) Inventors: Toshifumi Nakatani, Osaka (JP); Hiroshi Iwai, Osaka (JP)

(73) Assignee: Panasonic Corporation, Osaka (JP)

( * ) Notice: Subject to any disclaimer, the term of this patent is extended or adjusted under 35 U.S.C. 154(b) by 976 days.

(21) Appl. No.: 11/806,821

(22) Filed: Jun. 4, 2007

(65) Prior Publication Data

US 2007/0280297 A1 Dec. 6, 2007

(30) Foreign Application Priority Data

Jun. 5, 2006 (JP) .................................. 2006-156428

(51) Int. Cl.
*H04B 17/02* (2006.01)

(52) U.S. Cl. ........ 455/134; 455/132; 455/133; 455/272; 455/277.1; 455/277.2; 375/144; 375/147; 375/148; 375/267; 375/347

(58) Field of Classification Search .......... 455/272–275, 455/276.1, 277.1, 277.2, 278.1, 279.1, 132–141; 375/327, 322, 232, 144, 147, 148, 267, 347; 341/143
See application file for complete search history.

(56) References Cited

U.S. PATENT DOCUMENTS

| | | | | |
|---|---|---|---|---|
| 4,433,344 A | * | 2/1984 | Gradin et al. ................. | 348/706 |
| 5,430,415 A | | 7/1995 | Maru | |
| 5,483,555 A | * | 1/1996 | Hattori ........................... | 375/327 |
| 6,181,740 B1 | * | 1/2001 | Yasuda .......................... | 375/232 |
| 6,225,928 B1 | * | 5/2001 | Green ........................... | 341/143 |
| 2006/0099925 A1 | * | 5/2006 | Tsai et al. ...................... | 455/272 |
| 2007/0071132 A1 | * | 3/2007 | May et al. ...................... | 375/322 |
| 2007/0121768 A1 | * | 5/2007 | Rooyen ......................... | 375/347 |

FOREIGN PATENT DOCUMENTS

| | | |
|---|---|---|
| JP | 62-279743 | 12/1987 |
| JP | 05-218864 | 8/1993 |
| JP | 6-303264 | 10/1994 |
| JP | 10-163912 | 6/1998 |
| JP | 2002-374224 | 12/2002 |
| JP | 2003-087039 | 3/2003 |
| JP | 2004-521575 | 7/2004 |
| JP | 2005-109874 | 4/2005 |
| JP | 2005-522909 | 7/2005 |
| JP | 2006-135814 | 5/2006 |
| WO | 2005/011128 | 2/2005 |

* cited by examiner

*Primary Examiner* — Junpeng Chen
(74) *Attorney, Agent, or Firm* — Wenderoth, Lind & Ponack, L.L.P.

(57) ABSTRACT

Reception signals received by first to fourth antennas 11 to 14 are sequentially selected one by one repeatedly in accordance with first to fourth switches 31 to 34 being controlled by first to fourth switch control circuits 41 to 44, respectively, so as to be inputted to a signal shaping section 60. The reception signals having been shaped by the signal shaping section 60 are sampled by a sample-and-hold section 71 and AD-converted by an AD converter 72 in accordance with a time at which the reception signals are sequentially selected. The resultant signals are converted into parallel signals by a serial-parallel conversion section 73. Thus, the parallel signals are obtained as the reception signals of the first to the fourth antennas 11 to 14.

13 Claims, 19 Drawing Sheets

F I G. 3
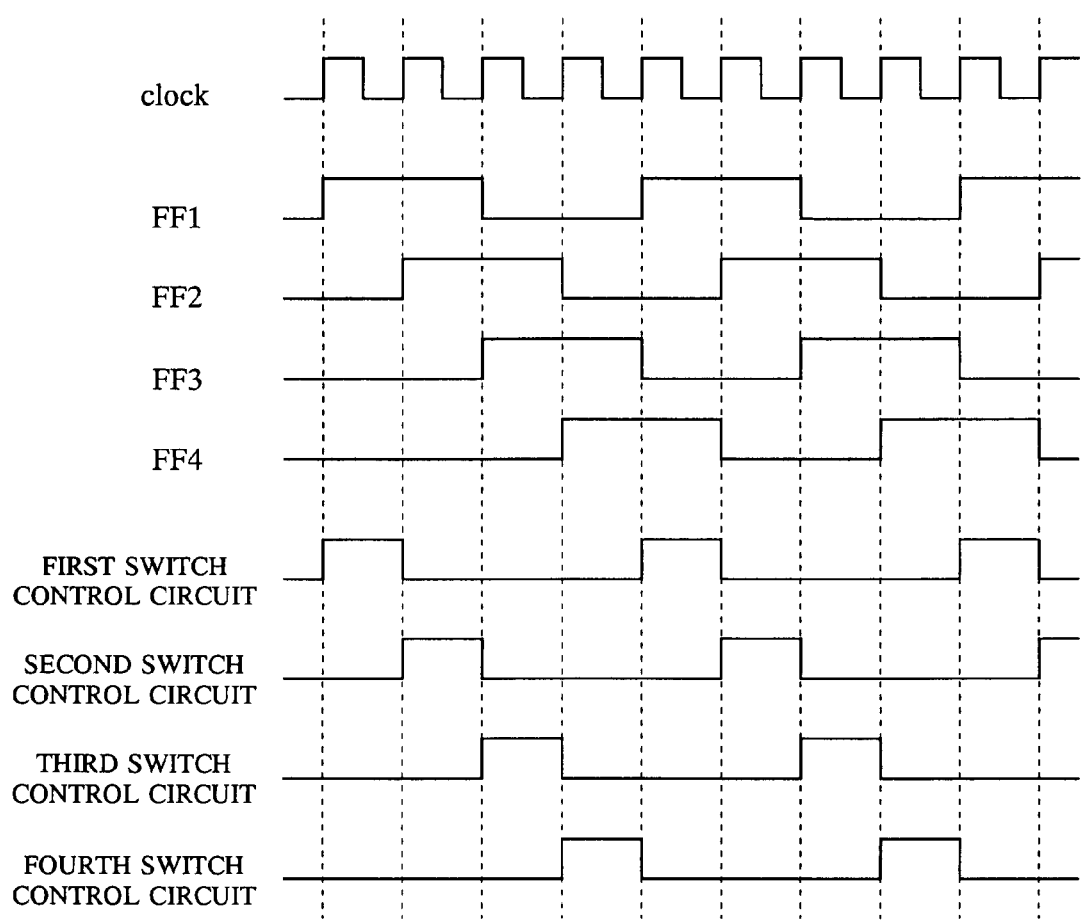

MULTI-ANTENNA COMMUNICATION APPARATUS

BACKGROUND OF THE INVENTION

1. Field of the Invention

The present invention relates to a multi-antenna communication apparatus for use in a wireless system for simultaneously receiving signals by a plurality of antennas, and controlling directivity or performing high speed transmission utilizing spatial correlation reduced in a certain radio wave environment.

2. Description of the Background Art

In recent years, widespread are various applications, for radio communication, used for a mobile telephone, a wireless LAN, a digital television, and the like. Therefore, a next-generation wireless system is required to solve the following two problems.

One of the problems is occurrence of fading. The fading occurs in an environment (referred to as multiple wave environment) in which radio waves are transmitted via a plurality of reflex paths from a certain antenna, and received by another antenna. In the multiple wave environment, a plurality of reflected waves are generated, and counteract each other when a certain positional relationship condition between antennas is satisfied. The plurality of reflected waves counteract each other because a phase difference between the radio waves transmitted via different paths is 180 degrees at a reception antenna side under the certain condition. Therefore, receiver sensitivity becomes substantially poor, thereby interrupting the communication.

The other of the problems is that it is necessary to increase frequency bands so as to realize high speed transmission. Advance in IT technology leads to substantial increase of data amount used in mobile networks. However, available radio frequencies are limited. As a result, a conventional communication system does not allow substantial increase of data transmission speed.

One of the wireless systems capable of solving the problems is a multi-antenna wireless system. The multi-antenna wireless system performs communication using a plurality of antennas. The multi-antenna wireless system allows a total directivity of the plurality of antennas to be electrically controlled, and allows selection of one of the plurality of reflected waves, thereby preventing the fading.

Further, in the multi-antenna wireless system, a plurality of antennas receive radio waves transmitted by another plurality of antennas, and separate received data into data corresponding to each of the transmission antennas. This system is called MIMO, which allows the data transmission speed to be enhanced.

FIG. 17 is a diagram illustrating an exemplary structure of a conventional multi-antenna wireless device disclosed in Japanese Laid-Open Patent Publication No. 2002-374224 (Patent Document 1). As shown in FIG. 17, in a conventional art, the number of reception circuits required for realizing the multi-antenna function is the same as the number of reception antennas. If this technology is applied to the mobile communication terminal, a scale of the terminal is increased, thereby reducing competitive advantages in market.

This problem is solved by using a compact multi-antenna wireless device disclosed in, for example, Japanese Laid-Open Patent Publication No. 62-279743 (Patent Document 2), Japanese translation of PCT international application No. 2004-521575 (Patent Document 3), and Japanese translation of PCT international application No. 2005-522909 (Patent Document 4).

FIG. 18 is a diagram illustrating an exemplary structure of the conventional multi-antenna wireless device disclosed in Patent Document 2. In an example shown in FIG. 18, frequencies of local oscillator signals used for two RF circuits are different by fs from each other. Therefore, IF frequencies are different by fs from each other. Accordingly, the local oscillator signals of the two systems are combined, and the combined local oscillator signals are demodulated in a circuit performing the following processes. Thus, a portion of an IF circuit and a portion of a demodulation circuit is shared by the two systems, thereby reducing a size of a reception circuit.

FIG. 19 is a diagram illustrating an exemplary structure of a conventional multi-antenna wireless device disclosed in Patent Document 3. In an example shown in FIG. 19, a mixer is provided following one of two antennas. Further, for a signal of a local oscillator of the mixer, used is a frequency which is different by fs from a harmonic frequency which is twice as high as an RF. Thus, it is possible to combine, with the RF, a frequency of a mixer output signal which is different by fs from the RF frequency, and down-convert and demodulate the combined signal. Thus, an RF circuit, an IF circuit, and an AD converter are shared, thereby reducing a size of a reception circuit.

FIG. 20 is a diagram illustrating an exemplary structure of a conventional multi-antenna wireless device disclosed in Patent Document 4. In an example shown in FIG. 20, modulators (coders) are provided following antennas, respectively. Each of the modulators modulates a reception signal of a corresponding one of the antennas by using an orthogonal code typified by Walsh code. Thus, the reception signals of a plurality of antennas having the same frequency are combined with each other, and a demodulation circuit can separate the reception signals. Therefore, an RF circuit and an AD converter can be shared by the antennas of all systems, thereby reducing a size of a reception circuit.

However, the conventional multi-antenna wireless device shown in FIG. 18 requires RF circuits of two systems. Further, the RF circuits of two systems have the local oscillator frequencies different from each other, and therefore the local oscillators of two systems are required. Therefore, reduction of an overall size of the multi-antenna wireless device is limited.

Further, the conventional multi-antenna wireless device shown in FIG. 19 requires a mixer and a local oscillator operating at the double harmonic frequency. Further, the conventional multi-antenna wireless device shown in FIG. 19 requires a filter for suppressing an interfering wave having a frequency which is different by fs from a desired frequency of a signal received by each of the antennas. Therefore, reduction of an overall size of the multi-antenna wireless device is limited.

Further, in the conventional multi-antenna wireless device shown in FIG. 20, it is necessary to provide a modulator operating at an RF for each of the antennas. Therefore, reduction of an overall size of the multi-antenna wireless device is limited.

Therefore, Japanese Laid-Open Patent Publication No. 2006-135814 (Patent Document 5) discloses a multi-antenna wireless device which is able to prevent the fading, perform high speed transmission without increasing a frequency band, and increasingly reduce a device scale as shown in FIG. 21.

However, in the conventional multi-antenna wireless device shown in FIG. 21, a multiplexer 20 switches from a certain antenna to another antenna too rapidly, whereby a discontinuous point of a signal appears. In this case, if a difference is large between a reception signal voltage of the certain antenna and the reception signal voltage of the another antenna to which the certain antenna has been switched, a voltage waveform becomes discontinuous when the switching is performed, and therefore an output signal contains large harmonic components. A waveform of the signal containing the harmonic components is distorted due to the frequency characteristic thereof when the signal containing the harmonic components passes through a matching circuit or a baseband filter circuit used in a radio frequency circuit, which may causes a transmission error.

SUMMARY OF THE INVENTION

Therefore, an object of the present invention is to provide a multi-antenna communication apparatus capable of preventing the fading, performing high speed transmission without increasing a frequency band, increasingly reducing a device scale, and minimizing a harmonic component.

The present invention is directed to a multi-antenna communication apparatus comprising a multi-antenna receiver for simultaneously receiving signals using a plurality of antennas. In order to attain the object mentioned above, the multi-antenna communication apparatus of the present invention comprises: N antennas; N switches operable to receive signals from the N antennas, respectively; a switch control circuit operable to repeatedly control the N switches so as to be ON one by one for a predetermined time period in a predetermined sequence such that a voltage waveform before a switching time is matched to a voltage waveform after the switching time so as to reduce a difference of a voltage to a predetermined value at a discontinuous point where the voltage waveform before the switching time and the voltage waveform after the switching time are discontinuous; a signal shaping section operable to receive, as serial signals, reception signals outputted by the N switches in accordance with a control performed by the switch control circuit, and shape the serial signals; an AD converter operable to analog-to-digital convert, in synchronization with a time at which the switch control circuit performs the control, the serial signals having been shaped by the signal shaping section; and a serial-to-parallel conversion section operable to convert, into parallel signals, the serial signals having been digitalized by the AD converter, so as to generate, in the predetermined sequence, N signals corresponding to the N antennas.

It is preferable that the signal shaping section downconverts the reception signals outputted by the N switches, and outputs the downconverted reception signals to the AD converter. Alternatively, it is preferable that the signal shaping section downconverts the reception signals outputted by the N switches, and outputs the downconverted reception signals passed through a discrete time filter, to the AD converter. Further, it is preferable that the AD converter performs a sampling at an intermediate time of the predetermined time period for which the switch control circuit performs ON control. The discrete time filter may include a charge sampling filter and a decimation filter combined with each other.

Typically, each of the N switches is a circuit in which either a plurality of FET switches each having a different size or a plurality of MEMS switches each having a different size are connected in parallel with each other, and the switch control circuit sequentially turns ON either the plurality of FET switches one by one or the plurality of MEMS switches one by one, and sequentially turns OFF either the plurality of FET switches one by one or the plurality of MEMS switches one by one such that the difference of the voltage is reduced to the predetermined value at the discontinuous point.

Alternatively, each of the N switches is a circuit in which either a plurality of FET switches serially connected to a plurality of attenuators, respectively, or a plurality of MEMS switches serially connected to the plurality of attenuators, respectively, are connected in parallel with each other, the plurality of attenuators having different attenuation amounts from each other, and the switch control circuit sequentially turns ON either the plurality of FET switches one by one or the plurality of MEMS switches one by one, and sequentially turns OFF either the plurality of FET switches one by one or the plurality of MEMS switches one by one such that the difference of the voltage is reduced to the predetermined value at the discontinuous point.

Alternatively, each of the N switches is a circuit in which either a plurality of FET switches having a same size or a plurality of MEMS switches having a same size are connected in parallel with each other, and the switch control circuit sequentially turns ON either the plurality of FET switches one by one or in combination or the plurality of MEMS switches one by one or in combination, and sequentially turns OFF either the plurality of FET switches one by one or in combination or the plurality of MEMS switches one by one or in combination such that the difference of the voltage is reduced to the predetermined value at the discontinuous point. In this case, it is preferable that either the plurality of FET switches or the plurality of MEMS switches are turned ON one by one or in combination in a different sequence for each ON control, and either the plurality of FET switches or the plurality of MEMS switches are turned OFF one by one or in combination in a different sequence for each OFF control, so as to prevent variations.

Alternatively, each of the N switches may be a circuit in which either a plurality of FET switches or a plurality of MEMS switches are connected in parallel with each other, and the switch control circuit may turn the N switches ON and OFF using a ΔΣ-modulated voltage so as to reduce the difference of the voltage to the predetermined value at the discontinuous point.

An output signal of the switch control circuit is waveform-shaped by using a Hamming window function, a Hanning window function, or a Root Nyquist window function.

According to the present invention, one reception circuit is capable of receiving signals from multiple antennas. Thus, a multi-antenna communication apparatus which has a reduced size and is capable of reducing degradation of receiver sensitivity caused by waveform distortion.

These and other objects, features, aspects and advantages of the present invention will become more apparent from the following detailed description of the present invention when taken in conjunction with the accompanying drawings.

BRIEF DESCRIPTION OF THE DRAWINGS

FIG. 3 is a diagram illustrating exemplary output waveforms of a frequency divider circuit 76 and first to fourth switch control circuits 41 to 44;

DESCRIPTION OF THE PREFERRED EMBODIMENTS

First Embodiment

Figure 1:
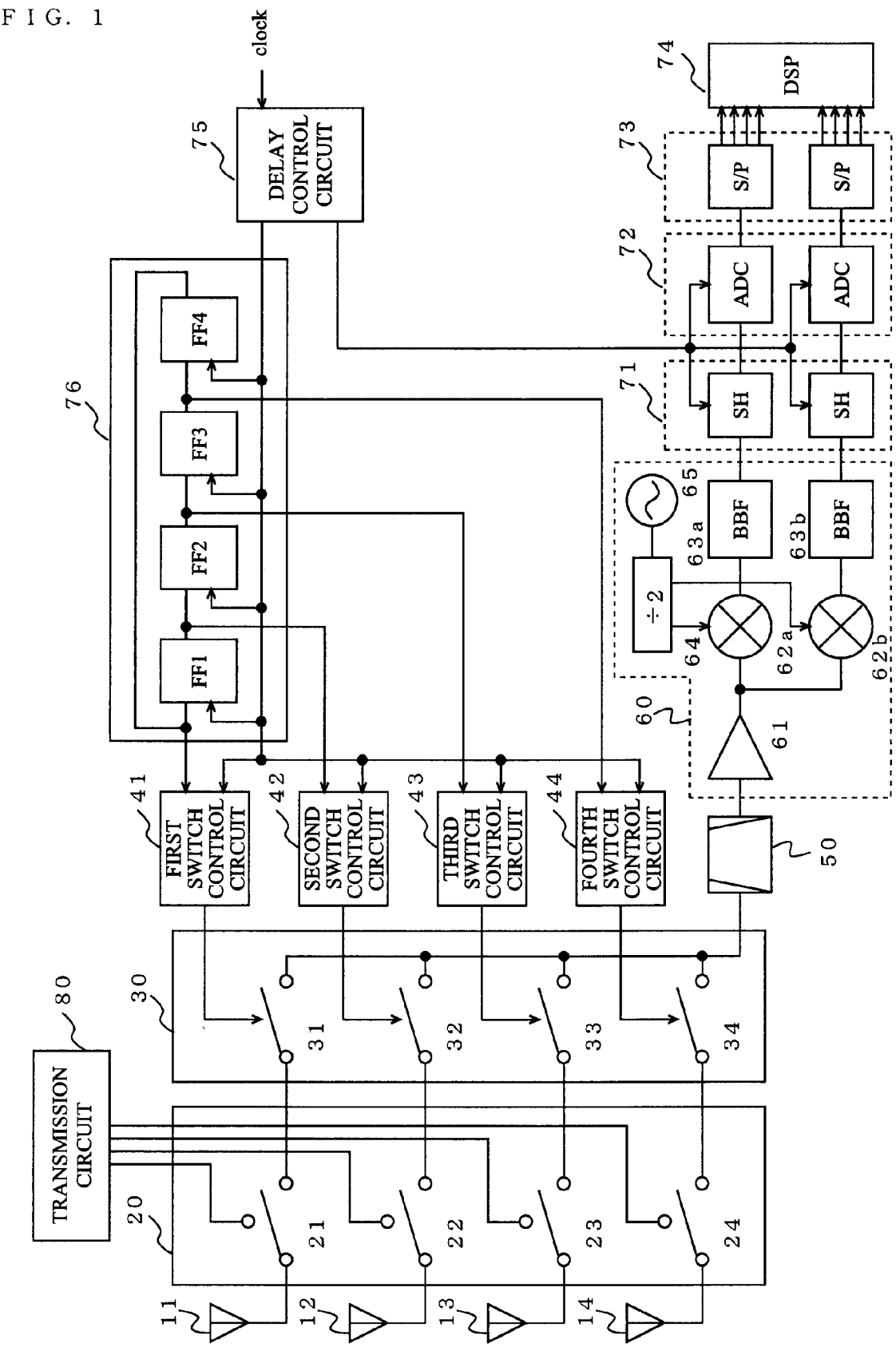
FIG. 1 is a diagram illustrating an exemplary structure of a multi-antenna communication apparatus according to a first embodiment of the present invention.

FIG. 1 is a diagram illustrating an exemplary structure of a multi-antenna communication apparatus, for use in a TDD system, according to a first embodiment of the present invention. The multi-antenna communication apparatus of the first embodiment shown in FIG. 1 comprises first to fourth antennas 11 to 14, an antenna switch 20, a signal selector switch 30, first to fourth switch control circuits 41 to 44, a band selection filter 50, a signal shaping section 60, a sample-and-hold section (SH) 71, an AD converter (ADC) 72, a serial-parallel conversion section (S/P) 73, a digital signal processor (DSP) 74, a delay control circuit 75, a frequency-divider circuit 76, and a transmission circuit 80.

Each of the antenna switch 20 and the signal selector switch 30 includes four switches corresponding to the first to the fourth antennas 11 to 14. The signal shaping section 60 includes a low noise amplifier 61, a downmixers 62a and 62b, baseband filters 63a and 63b, a frequency divider 64, and a local oscillator 65. Each of the sample-and-hold section 71, the AD converter 72, and the serial-parallel conversion section 73 includes two units having the same structure.

FIG. 1 shows an exemplary structure of a communication apparatus in which a QPSK signal is processed as a reception signal, and each of the downmixer, the baseband filter, the sample-and-hold section, the AD converter, and the serial-parallel conversion section includes two units having the same structure for an I signal and a Q signal. Therefore, the communication apparatus processing, for example, a BPSK signal may have a structure in which the aforementioned components such as the downmixer do not require two units having the same structure, that is, requires only one unit.

Reception signals of the first to the fourth antennas 11 to 14 are inputted via the antenna switch 20 to a first to a fourth switches 31 to 34, respectively, of the signal selector switch 30. One of the first to the fourth switches 31 to 34 outputs, to the band selection filter 50, the reception signal having been inputted thereto in accordance with instructions from the first to the fourth switch control circuits 41 to 44. The first to the fourth switch control circuits 41 to 44 give instructions to the first to the fourth switches 31 to 34, respectively, in accordance with clock signals each of which is generated, based on a predetermined clock signal (clock), by the frequency-divider circuit 76, and is delayed by ¼ cycle. Therefore, the first to the fourth switches 31 to 34 are sequentially kept ON one by one for a predetermined time period repeatedly.

Each of outputs from the first to the fourth switches 31 to 34 is inputted via the band selection filter 50 and the low noise amplifier 61 to the downmixers 62a and 62b, and the downmixers 62a and 62b frequency-convert the inputted signal into an I-signal and a Q signal, respectively. The I-signal and the Q-signal having been obtained through the frequency-conversion include interfering waves, and the baseband filters 63a and 63b reduce the interfering waves of the I-signal and the Q-signal, respectively. The signals each having the reduced interfering wave are sampled and held by the sample-and-hold section 71 in synchronization with a clock signal supplied by the delay control circuit 75, and thereafter are converted into digital signals by the AD converter 72 in synchronization with the clock signal. The delay control circuit 75 controls a time at which the first to the fourth switches 31 to 34 are to be turned ON/OFF, and a time at which the sample-and-hold section 71 and the AD converter 72 sample a voltage. Thus, it is possible to perform the sampling at a time when a switching noise generated by turning the first to the fourth switches 31 to 34 ON/OFF is reduced.

The digital signals obtained by the conversion performed by the AD converter 72 correspond to the reception signals of the first to the fourth antennas 11 to 14 which are serially outputted in a sequential manner repeatedly. Therefore, the serial-parallel conversion section 73 converts, into parallel digital signals, the digital signals which are serially outputted, thereby separating the digital signals into the reception signals of the first to the fourth antennas 11 to 14. The digital signal processor 74 processes, as the respective reception signals from the first to the fourth antennas 11 to 14, the parallel signals obtained by serial-parallel conversion.

Figure 4:
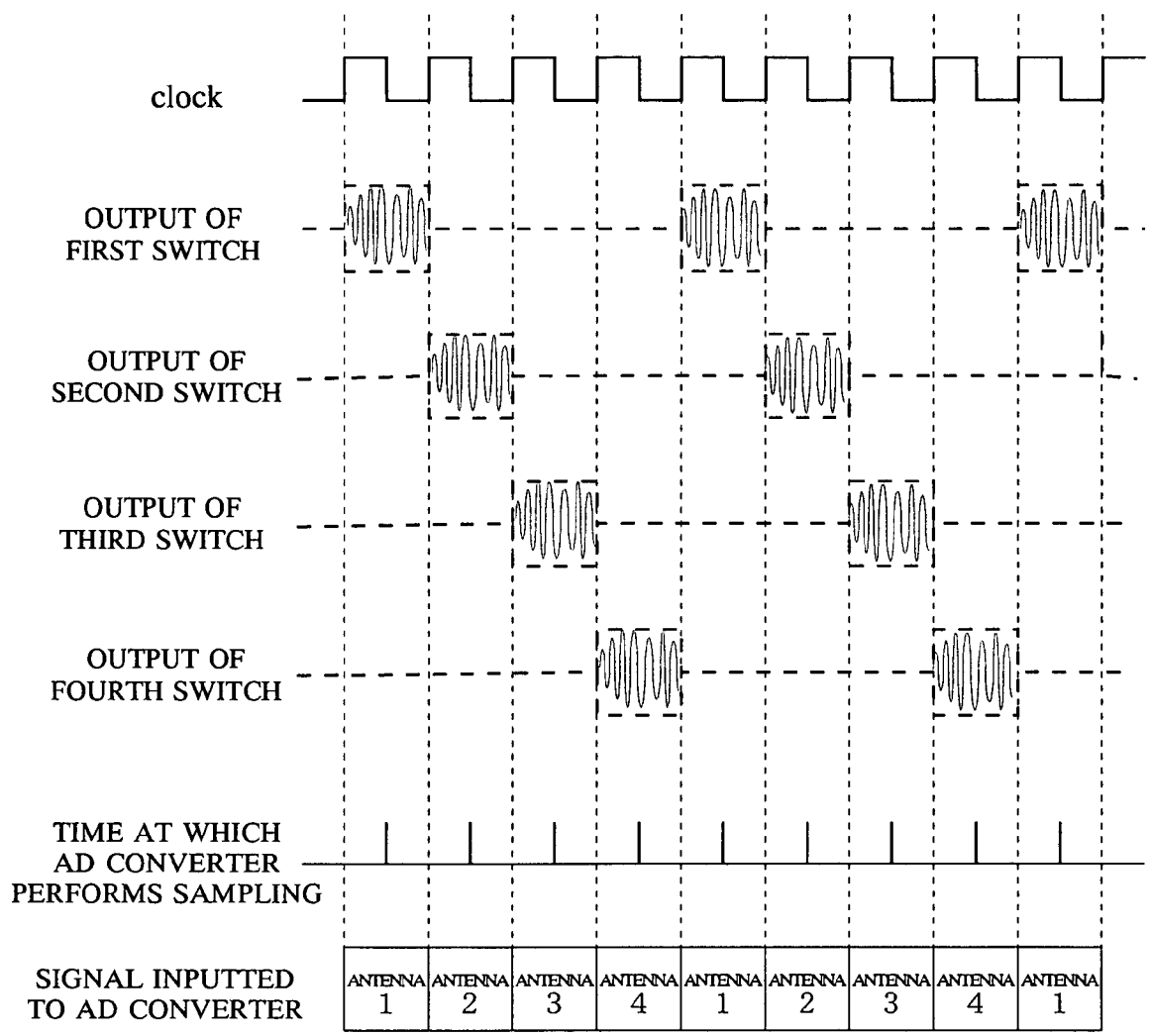
FIG. 4 is a diagram illustrating images of exemplary output waveforms of first to fourth switches 31 to 34.

Next, an operation principle of the present invention will be described with reference to FIGS. 2 to 4.

Second or later generation mobile telephones and the like use digital modulation and demodulation. In a communication apparatus performing digital modulation and demodulation, an AD converter thereof performs sampling at a speed which is several times as high as a transmission speed so as to demodulate a reception signal. That is, a voltage of the reception signal which is obtained by conversion into a baseband, which is performed at the moment of the sampling, is necessary for the demodulation.

Figure 2:
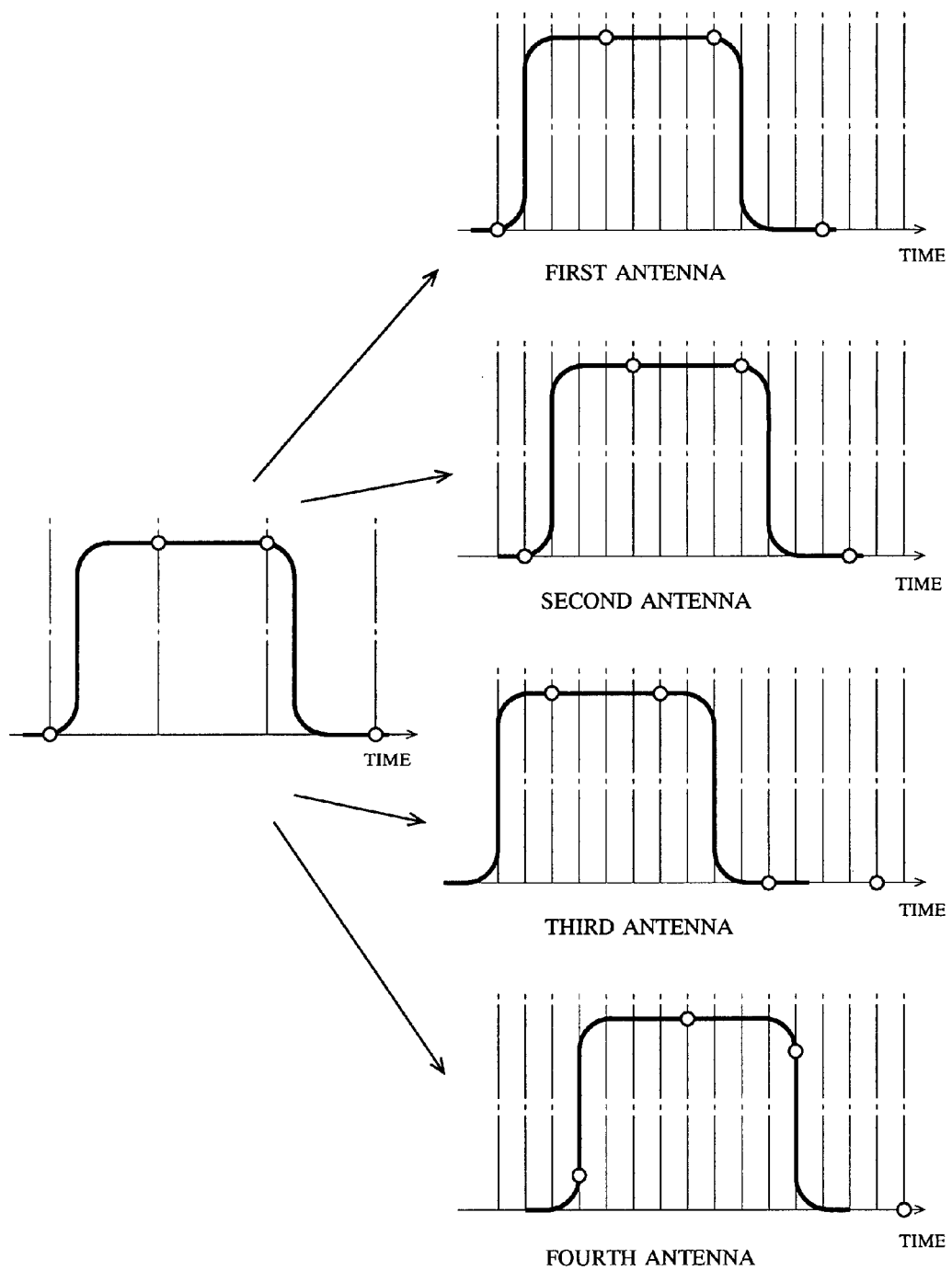
FIG. 2 is a diagram illustrating an exemplary sampling rate according to the first embodiment of the present invention.

In the multi-antenna communication apparatus having four antennas according to the first embodiment, the AD converter 72 uses a sampling rate which is four times as fast as that used for an apparatus having one antenna, as shown in FIG. 2. A voltage of a signal received by the first antenna 11 is sampled for the first time, and then a voltage of a signal received by the second antenna 12, a voltage of a signal received by the third antenna 13, and a voltage of a signal received by the fourth antenna 14 are sampled in order, respectively. Thereafter, a voltage of a signal received by the first antenna 11 is sampled again, and then the sampling is repeatedly performed in the sequential manner as described above.

The serial-parallel conversion section 73 separates, into the digital voltage signals corresponding to the reception signals received by the respective antennas, data signal obtained by the sampling. At this time, each of the digital voltage signals is equivalent in precision to a signal obtained by sampling a signal at a speed used for sampling a signal of one antenna by four AD converters. The digital voltage signals are sequentially obtained by delaying, by ¼ cycle, start of sampling each of the reception signals.

FIG. 3 is a diagram illustrating exemplary output waveforms of signals outputted by the frequency-divider circuit 76 and the first to the fourth switch control circuits 41 to 44. FIG. 4 is a diagram illustrating images of exemplary output waveforms of the signals outputted by the first to the fourth switches 31 to 34.

Figure 5:
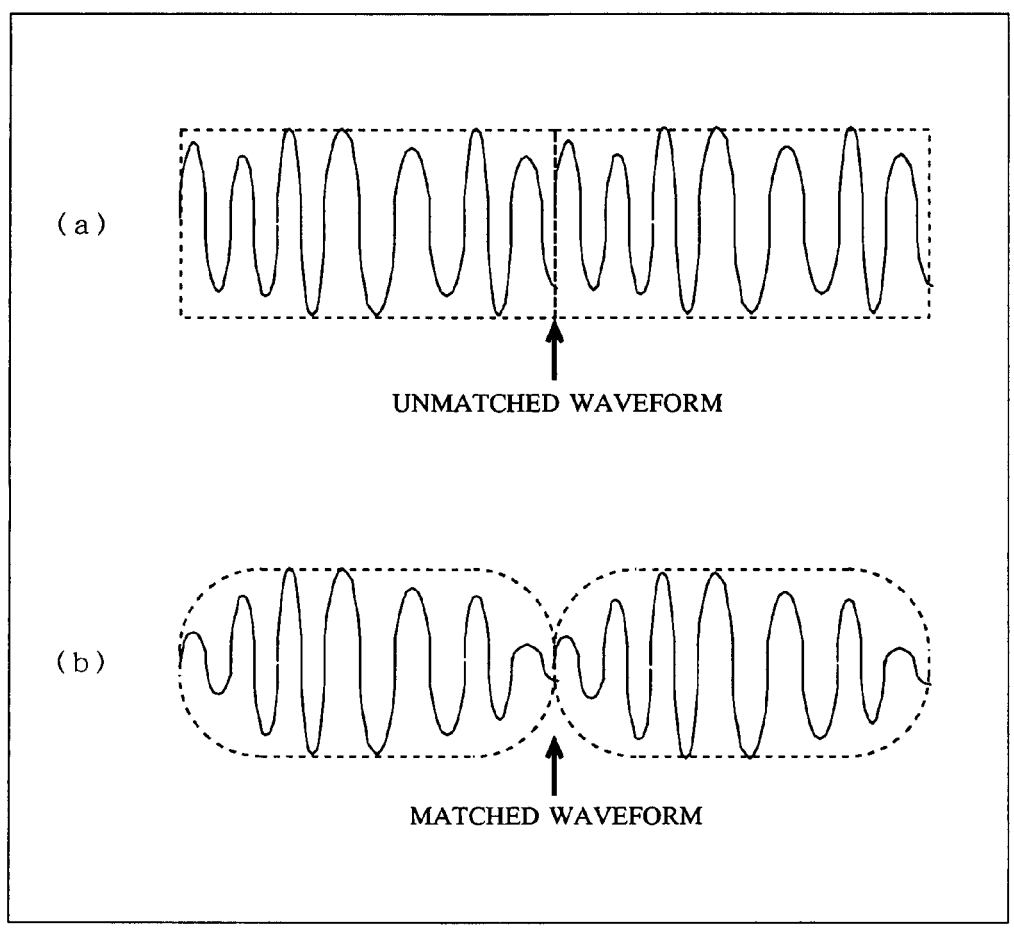
FIG. 5 and FIG. 6 are diagrams each illustrating a concept of an operation according to the first embodiment of the present invention.

As described for the conventional art, it is assumed that when a certain switch of the first to the fourth switches 31 to 34 is rapidly switched to another switch thereof in the multi-antenna communication apparatus of the first embodiment, if a difference is large between the reception signal voltage of the certain switch and the reception signal voltage of the another switch thereof to which the certain switch has been switched, a voltage waveform becomes discontinuous when the switching is performed, and an output signal contains large harmonic components. FIG. 5 shows images of the voltage waveforms at a node at which one of outputs from the first to the fourth switches 31 to 34 is combined with another thereof, and indicates a problem.

(a) of FIG. 5 shows a voltage waveform obtained when one switch is rapidly switched to another. (a) of FIG. 5 indicates that the voltage waveform becomes discontinuous when the switching is performed. Thus, a frequency spectrum of the output signal is extended, thereby resulting in a waveform distortion in circuits following the first to the fourth switches.

(b) of FIG. 5 shows a voltage waveform obtained when one switch is not rapidly switched to another. (b) of FIG. 5 indicates that a signal waveform obtained before the switching is matched to a signal waveform obtained after the switching. That is, an envelope of an RF signal is shaped, so that the difference in voltage at a point at which the voltage waveform is discontinuous is reduced so as to prevent appearance of the point at which the voltage waveform is discontinuous. Thus, the extension of the frequency spectrum of the output signal is reduced, thereby reducing the waveform distortion in the circuits following the first to the fourth switches.

Therefore, according to the present invention, the first to the fourth switches 31 to 34 are controlled such that the ON-to-OFF or OFF-to-ON switching for the first to the fourth switches 31 to 34 is gradually performed in a step-by-step manner, so that the voltage waveform obtained before the switching is matched to the voltage waveform obtained after the switching, thereby reducing the difference in voltage at the point at which the waveform is to be discontinuous and in turn minimizing the harmonic component. It is idealistic that the difference in voltage is reduced to zero. In practice, however, the difference in voltage is reduced to a predetermined value so as to prevent the harmonic component from exerting an influence on the output signal.

Figure 6:
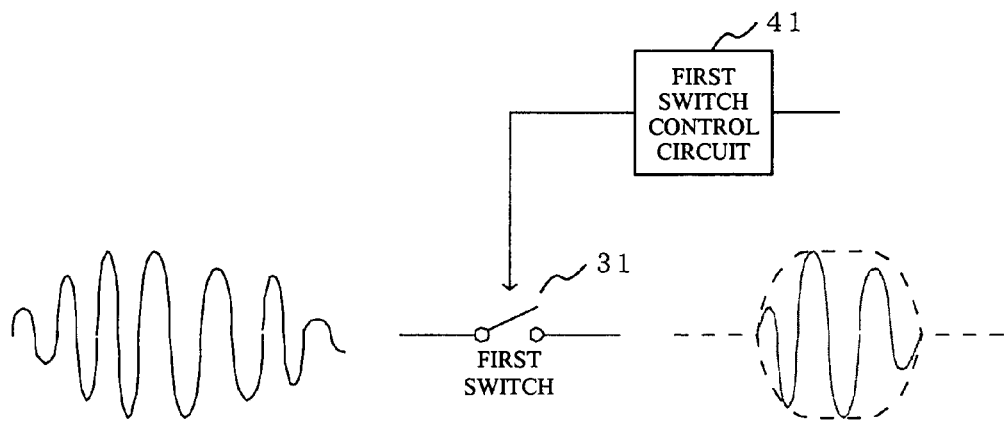

FIG. 6 shows a concept of the aforementioned switching control. According to the present invention, as described below, the first to the fourth switches 31 to 34 each having a characteristic structure cooperate with the first to the fourth switch control circuits 41 to 44 each performing characteristic control, respectively, thereby reducing the harmonic component. In each of examples described below, the first switch 31 and the first switch control circuit 41 cooperate with each other. The second to the fourth switches 32 to 34 cooperate with the second to the fourth switch control circuits 42 to 44, respectively, in the same manner as the first switch 31 and the first switch control circuit 41.

FIRST EXAMPLE

Figure 7:
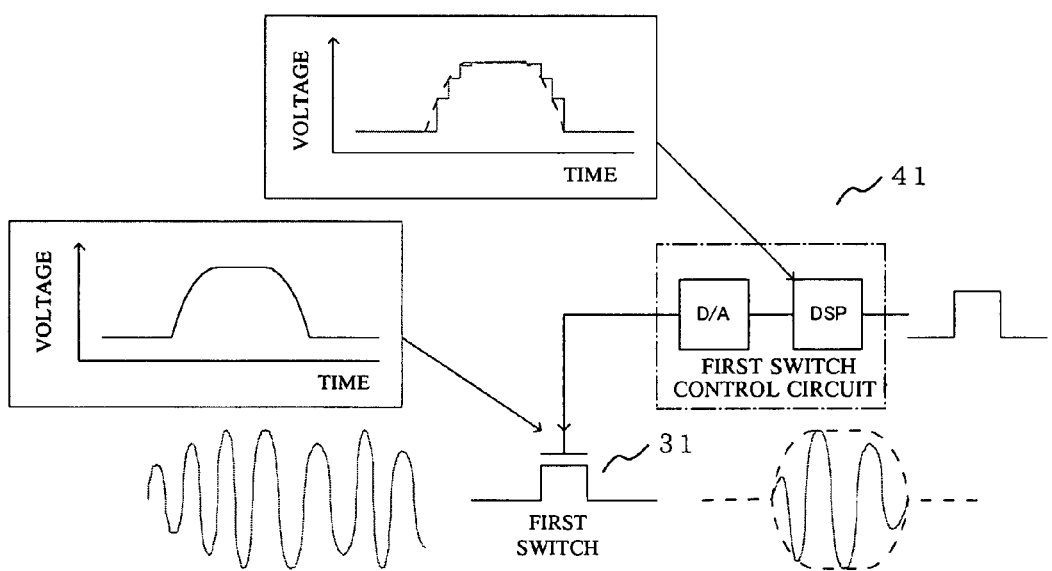
FIGS. 7 to 11 are diagrams each illustrating multi-antenna communication apparatus of first to fifth examples, respectively, according to the first embodiment of the present invention.

FIG. 7 is a diagram illustrating a configuration of a first example in which a field-effect transistor (FET) is used as the first switch 31, and a digital signal processor (DSP) and a DA converter (D/A) are used for the first switch control circuit 41.

The digital signal processor shapes a waveform of an inputted clock signal using Hanning window function or Root-Nyquist window function. The DA converter converts, into an analog signal, the digital clock signal having been waveform-shaped. Through this process, a control signal having a smooth rise and fall is generated. By using this control signal, the FET is gradually switched ON or OFF, thereby changing an envelope of an output signal and reducing difference in voltage at a point where a voltage waveform is discontinuous. The FET may be replaced with a MEMS switch or the like.

SECOND EXAMPLE

Figure 8:
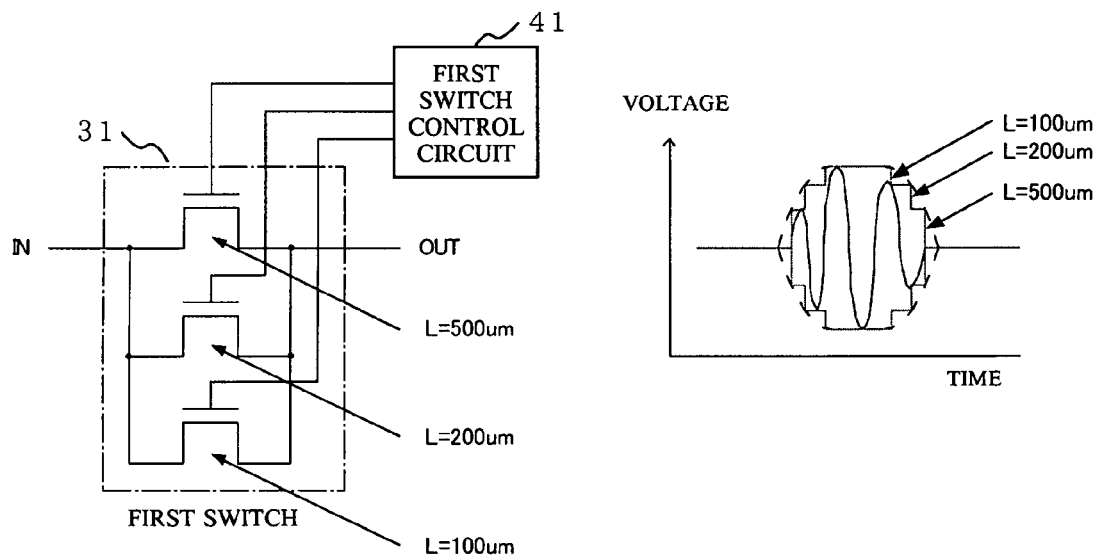

FIG. 8 is a diagram illustrating a configuration of a second example in which three field-effect transistors (FETs) which have different sizes from each other and are connected in parallel with each other are used for the first switch 31, and a circuit for performing ON and OFF switching for the three FETs is used as the first switch control circuit 41.

The sizes of the three FETs are L=100 μm, L=200 μm, and L=500 μm. When the reception signal rises, the first switch control circuit 41 sequentially turns OFF the FETs in decreasing order of size. On the other hand, when the reception signal falls, the first switch control circuit 41 sequentially turns ON the FETs in increasing order of size. The ON or OFF switching for the FETs is sequentially performed, thereby changing an envelope of an output signal and reducing difference in voltage at a point where a voltage waveform is discontinuous. The number and the sizes of the FETs connected in parallel with each other are not restricted to those described for this example. The number and the sizes thereof may be arbitrarily determined. Further, the FETs may be replaced with MEMS switches or the like.

THIRD EXAMPLE

Figure 9:
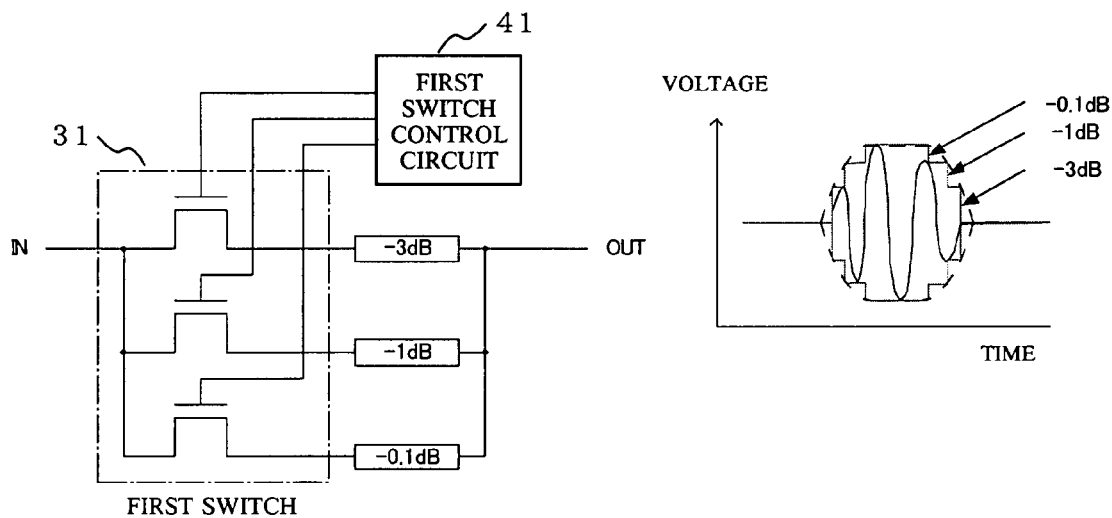

FIG. 9 is a diagram illustrating a configuration of a third example in which three field-effect transistors (FETs) connected in parallel with each other, and three attenuators (ATTs) which have different attenuation amounts from each other, and are serially connected to the respective FETs are used for the first switch 31, and a circuit for performing ON and OFF switching for the three FETs is used as the first switch control circuit 41.

In the third example, the three FETs have the same size, and the attenuation amounts of the attenuators serially connected to the respective FETs are −3 dB, −1 dB, and −0.1 dB. When the reception signal rises, the first switch control circuit 41 sequentially turns OFF the FETs in decreasing order of the attenuation amount of the connected attenuator. On the other hand, when the reception signal falls, the first switch control circuit 41 sequentially turns ON the FETs in increasing order of the attenuation amount of the connected attenuator. The ON or OFF switching for the FETs is sequentially performed, thereby changing an envelope of an output signal and reducing difference in voltage at a point where a voltage waveform is discontinuous. The number of the FETs connected in parallel with each other, the number of the attenuators, and the attenuation amounts of the attenuators are not restricted to those described for this example. The numbers of the FETs and the attenuators and the attenuation amounts of the attenuators may be arbitrarily determined. Further, the FETs may be replaced with MEMS switches or the like.

FOURTH EXAMPLE

Figure 10:
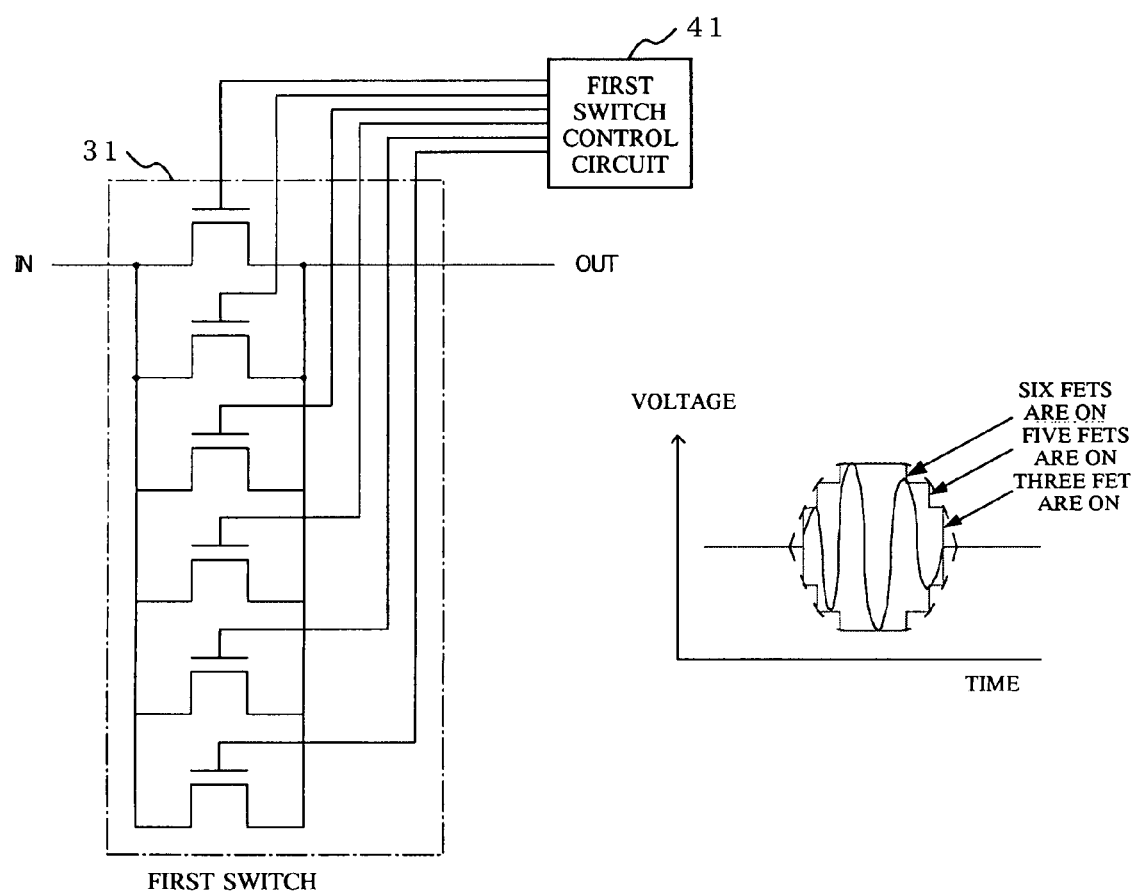

FIG. 10 is a diagram illustrating a configuration of a fourth example in which six field-effect transistors (FETs) connected in parallel with each other are used for the first switch 31, and a circuit for performing ON and OFF switching for the six FETs is used as the first switch control circuit 41.

In the fourth example, the six FETs each has a small size. When the reception signal rises, the first switch control circuit 41 sequentially turns OFF all of the six FETs. In this case, the number of the FETs to be simultaneously turned OFF may not be restricted to one. On the other hand, when the reception signal falls, the first switch control circuit 41 sequentially turns ON all of the six FETs. In this case, the number of the FETs to be simultaneously turned ON may not be restricted to one. The ON or OFF switching for the FETs is sequentially performed, thereby changing an envelope of an output signal and reducing difference in voltage at a point where a voltage waveform is discontinuous.

Preferably, the order in which the FETs are sequentially turned ON or OFF is different for each ON or OFF switching for the six FETs. This is because, for example, the MOSFET has variations in ON resistance and OFF isolation, and the variations cause variation in shaping of the envelope of the output signal. If a plurality of the FETs are sequentially turned ON in the same order, an error occurs, due to the variation, at the same position of the envelope. Therefore, the error periodically occurs, which causes a noise (spurious) occurring only at a certain constant frequency. Therefore, the order in which the FETs are sequentially turned ON or OFF is changed, so that the errors occur at various frequencies, thereby reducing influence on the reception signal.

The number of the FETs connected in parallel with each other is not restricted to that described in this example, and the number of the FETs may be arbitrarily determined. Further, the FETs may be replaced with MEMS switches or the like.

FIFTH EXAMPLE

Figure 11:
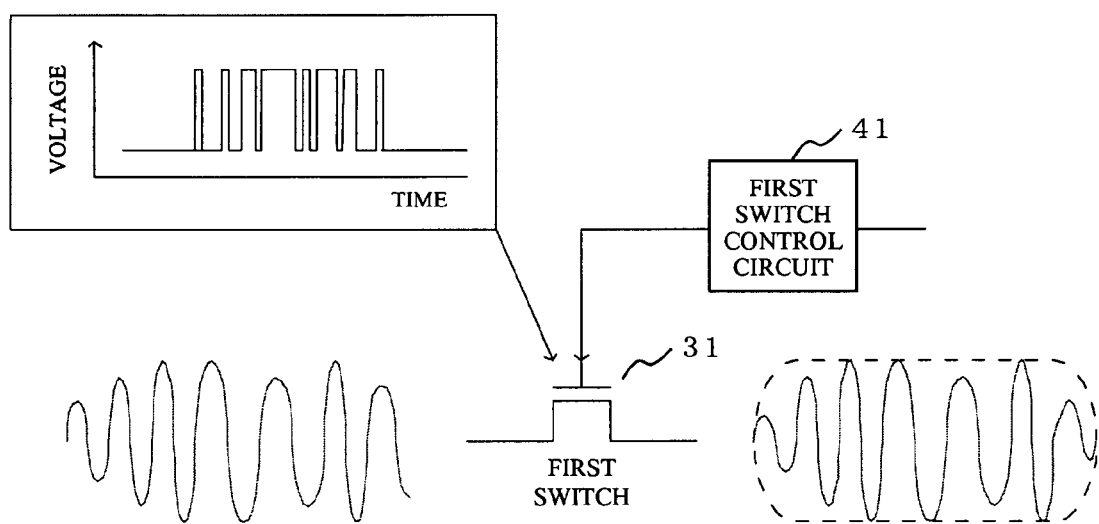

FIG. 11 is a diagram illustrating a configuration of a fifth example in which a field-effect transistor (FET) is used as the first switch 31, and a circuit for performing ON and OFF switching for the FET at a high speed is used as the first switch control circuit 41.

The first switch control circuit 41 shapes a waveform of an inputted clock signal by using Hanning window function, Hamming window function, or Root Nyquist window function, so as to generate a $\Delta\Sigma$-modulated control signal. By using this control signal, ON or OFF switching for the FET is performed at a high speed, thereby changing an envelop of an output signal. The FET may be replaced with a GaAs switch, a MOSFET switch, a MEMS switch or the like.

As described above, the multi-antenna communication apparatus according to the first embodiment of the present invention allows one reception circuit to receive signals of multiple antennas. Therefore, a size of the reception circuit can be reduced. The switches are gradually turned ON or OFF in a step-by-step manner so as to reduce the difference in voltage at the point where the voltage waveform is discontinuous, thereby minimizing harmonic component.

In the first embodiment, the antenna switch 20 and the signal selector switch 30 are provided separately from each other. However, the antenna switch 20 and the signal selector switch 30 may be integrated. The band selection filter 50 and the low noise amplifier 61 are provided following the signal selector switch 30. However, the band selection filter 50 or both the band selection filter 50 and the low noise amplifier 61 may be provided preceding each of the first to the fourth switches 31 to 34 of the signal selector switch 30. Further, the delay control circuit 75 may control either the clock signals to be supplied to the first to the fourth switch control circuits 41 to 44, or the clock signals to be supplied to the sample-and-hold section 71 and the AD converter 72 when the delay control circuit 75 is capable of generating a delay between the two clock signals.

Figure 12:
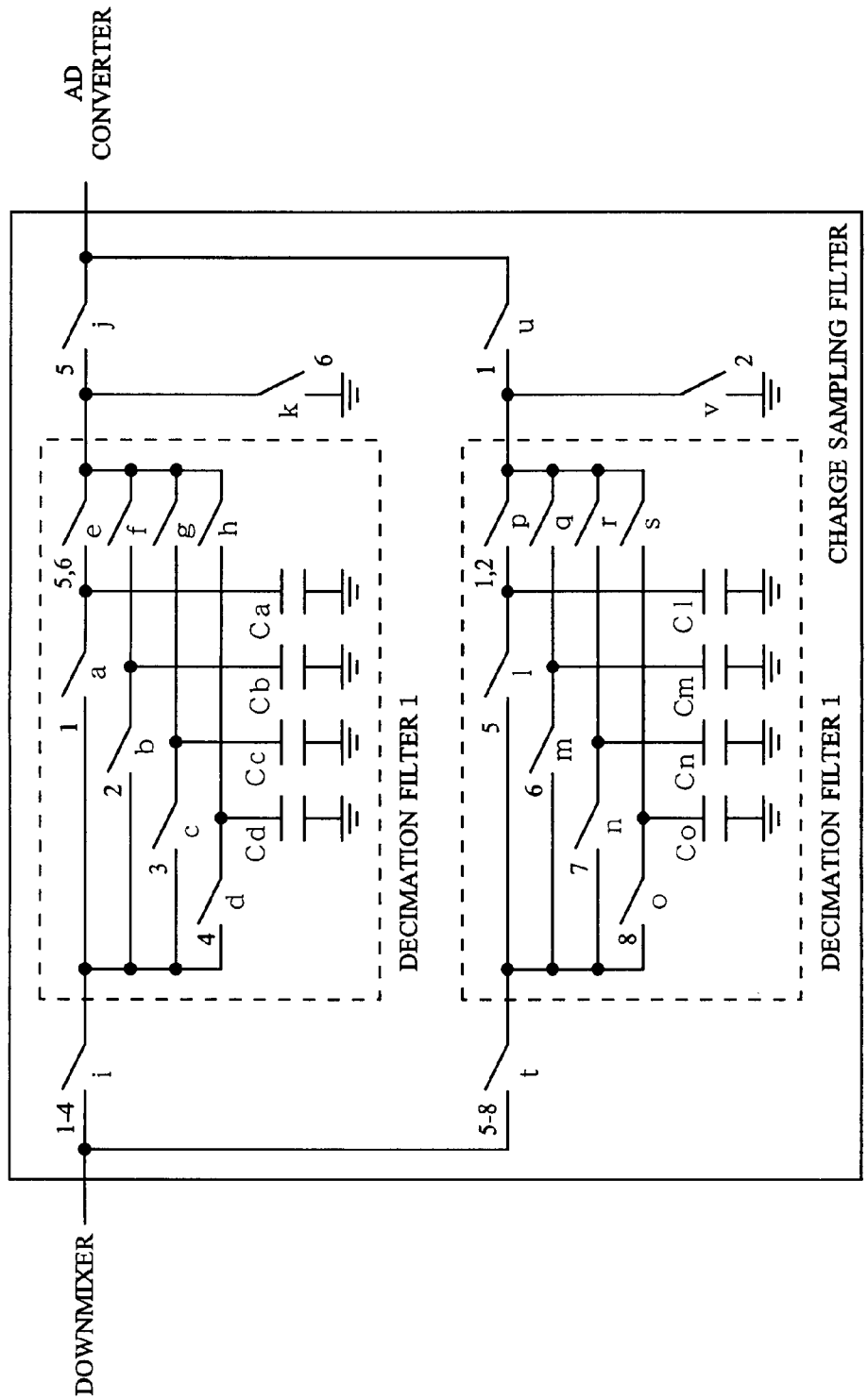
FIG. 12 is a diagram illustrating an exemplary circuit applicable to the multi-antenna communication apparatus according to the first embodiment of the present invention.

Further, for example, a circuit shown in FIG. 12 may be used as a circuit which has both the function of the baseband filters 63a and 63b and the function of the sample-and-hold section 71. The circuit shown in FIG. 12 includes two types of discrete time filters (decimation filters and a charge sampling filter) combined with each other. The circuit operates at a speed which is eight times as fast as the sampling rate used by the AD converter 72. Reference numerals 1 to 8 in FIG. 12 represent numbers of sampling time periods for which specific switches are ON.

For a first sampling time period, switches i, a, p, q, r, s, and u are ON, and switches t, b, c, d, e, f, g, h, j, k, l, m, n, o, and v are OFF. Therefore, a signal from the downmixer is sampled and held in capacitor Ca, and signals which are sampled and held in capacitors Cl, Cm, Cn, and Co are outputted to the AD converter.

For a second sampling time period, switches a and u are switched OFF, switches b and v are switched ON, and each of other switches is in the same state as in the first sampling time period. Therefore, a signal from the downmixer is sampled and held in capacitor Cb, and signals which are sampled and held in capacitors Cl, Cm, Cn, and Co are reset (discharged).

For a third sampling time period, switches b, p, q, r, s, and v are switched OFF, switch c is switched ON, and each of other switches is in the same state as in the second sampling time period. Therefore, a signal from the downmixer is sampled and held in capacitor Cc.

For a fourth sampling time period, switch c is switched OFF, switch d is switched ON, and each of other switches is in the same state as in the third sampling time period. Therefore, a signal from the downmixer is sampled and held in capacitor Cd.

For a fifth sampling time period, switches t, l, e, f, g, h, and j are ON, switches i and d are OFF, and each of other switches is in the same state as in the fourth sampling time period. Therefore, a signal from the downmixer is sampled and held in capacitor Cl, and signals which are sampled and held in capacitors Ca, Cb, Cc, and Cd are outputted to the AD converter.

For a sixth sampling time period, switches l and j are switched OFF, switches m and k are switched ON, and each of other switches is in the same state as in the fifth sampling time period. Therefore, a signal from the downmixer is sampled and held in capacitor Cm, and signals which are sampled and held in capacitors Ca, Cb, Cc, and Cd are reset (discharged).

For a seventh sampling time period, switches m, e, f, g, h, and k are switched OFF, switch n is switched ON, and each of other switches is in the same state as in the sixth sampling time period. Therefore, a signal from the downmixer is sampled and held in capacitor Cn.

For an eighth sampling time period, switch n is switched OFF, switch o is switched ON, and each of other switches is in the same state as in the seventh sampling time period. Therefore, a signal from the downmixer is sampled and held in capacitor Co.

After the eighth sampling time period, the first sampling time period follows, and the second to the eighth sampling time periods are repeated. That is, for the first to the fourth sampling time periods, the decimation filter 1 sequentially performs sampling-and-holding, and the decimation filter 2 performs signal output or resetting, and for the fifth to the eighth sampling time periods, the decimation filter 1 performs signal output or resetting, and the decimation filter 2 sequentially performs sampling-and-holding.

Preferably, the clock signal used in the circuit shown in FIG. 12 is obtained by frequency-dividing a local signal, and further, this clock signal is frequency-divided, and the AD converter 72, the sample-and-hold section 71, and the first to the fourth switches 31 to 34 use the clock signal having been frequency-divided.

SECOND EMBODIMENT

Figure 13:
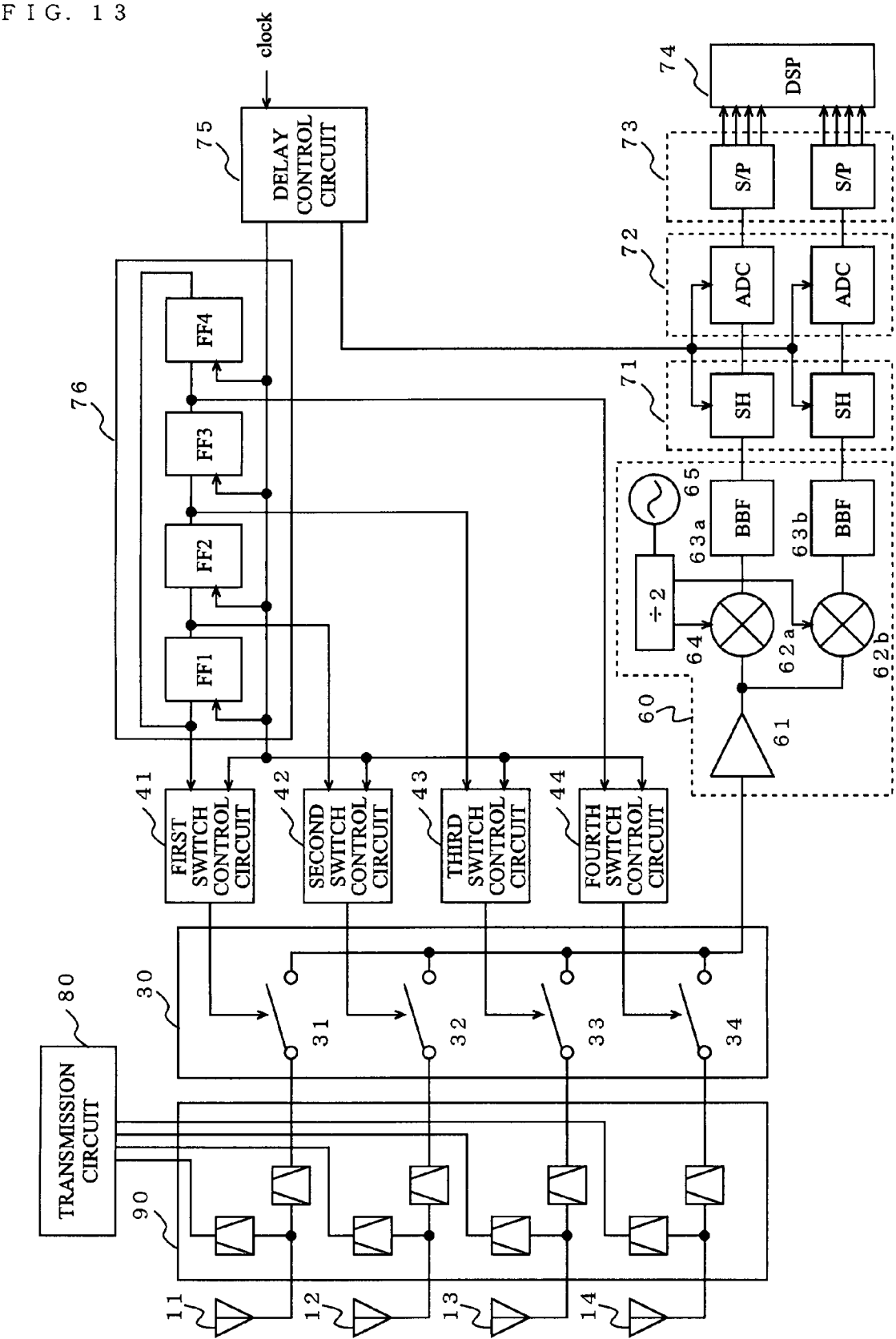
FIG. 13 is a diagram illustrating an exemplary structure of a multi-antenna communication apparatus according to a second embodiment of the present invention.

FIG. 13 is a diagram illustrating an exemplary structure of a multi-antenna communication apparatus, for use in an FDD system, according to a second embodiment of the present invention. In the second embodiment, the multi-antenna communication apparatus shown in FIG. 13 comprises the first to the fourth antennas 11 to 14, an antenna duplexer 90, the signal selector switch 30, the first to the fourth switch control circuits 41 to 44, the signal shaping section 60, the sample-and-hold section 71, the AD converter 72, the serial-parallel conversion section 73, the digital signal processor 74, the frequency-divider circuit 76, the delay control circuit 75, and the transmission circuit 80.

As shown in FIG. 13, the multi-antenna communication apparatus according to the second embodiment has the same structure as the multi-antenna communication apparatus according to the first embodiment except that the antenna duplexer 90 is used, in the second embodiment, instead of the antenna switch 20 and the band selection filter 50. The antenna duplexer 90 is configured such that filters each of which passes only a transmission signal are provided between the transmission circuit 80 and each of the first to the fourth antennas 11 to 14, and filters each of which passes only a reception signal are provided between the first antenna 11 and the first switch 31, between the second antenna 12 and the second switch 32, between the third antenna 13 and the third switch 33, and between the fourth antenna 14 and the fourth switch 34.

As described above, according to the second embodiment of the present invention, it is possible to realize a multi-antenna communication apparatus which has an antenna switching function of selecting one of the transmission signal and the reception signal and a band selection filter function, which are combined with each other, thereby reducing the size of the multi-antenna communication apparatus.

According to the second embodiment, the low noise amplifier 61 is provided following the signal selector switch 30. However, the low noise amplifiers 61 may be provided preceding and corresponding to the first to the fourth switches 31 to 34, respectively, of the signal selector switch 30.

THIRD EMBODIMENT

Figure 14:
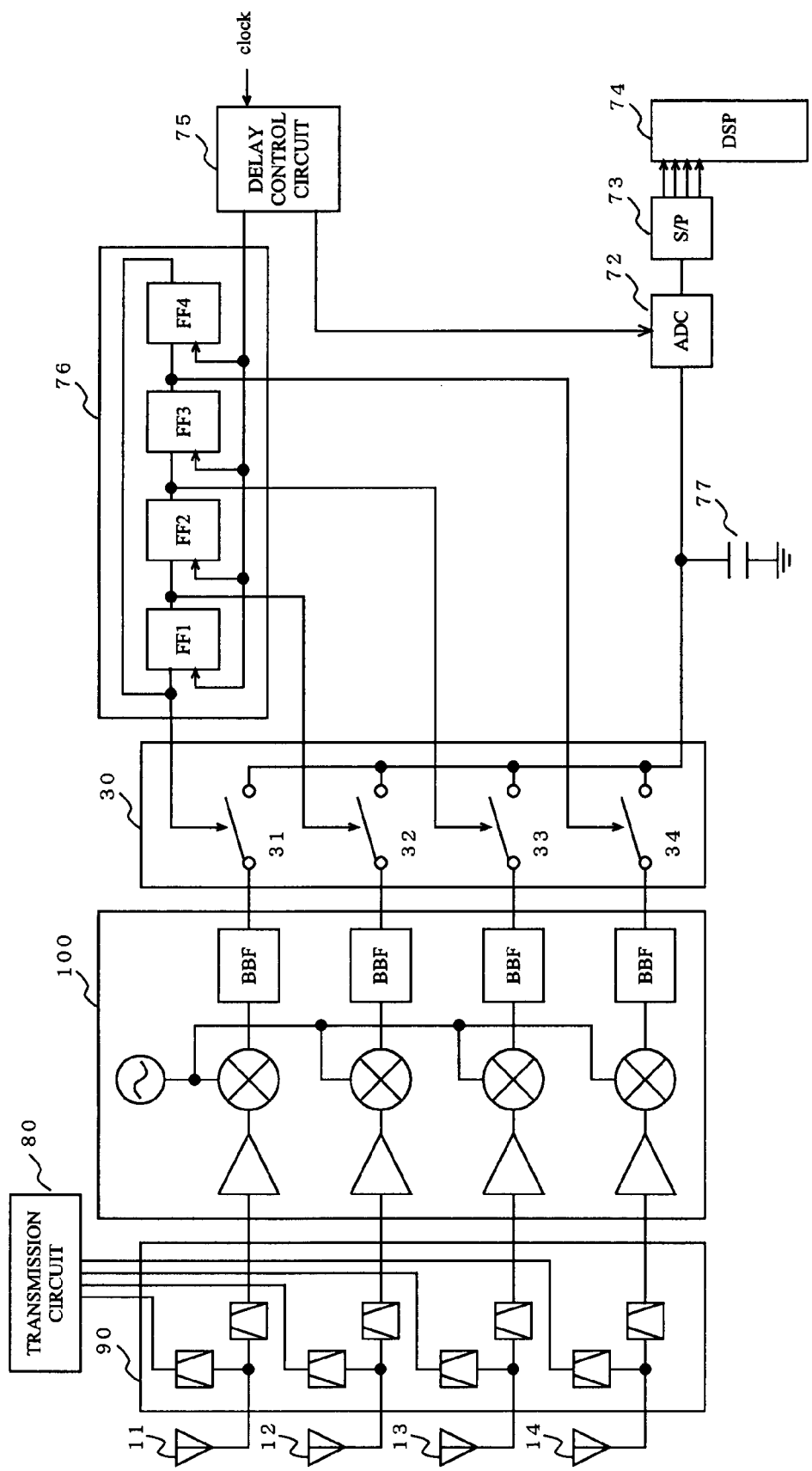
FIG. 14 is a diagram illustrating an exemplary structure of a multi-antenna communication apparatus according to a third embodiment of the present invention.

FIG. 14 is a diagram illustrating an exemplary structure of a multi-antenna communication apparatus according to a third embodiment of the present invention. The multi-antenna communication apparatus shown in FIG. 14 comprises the first to the fourth antennas 11 to 14, the antenna duplexer 90, a signal shaping section 100, the signal selector switch 30, the AD converter 72, the serial-parallel conversion section 73, the digital signal processor 74, the frequency-divider circuit 76, the delay control circuit 75, and the transmission circuit 80. The signal shaping section 100 includes a local oscillator, and four low noise amplifiers, four downmixers, and four baseband filters, all of which correspond to the first to the fourth antennas 11 to 14, respectively.

As shown in FIG. 14, the multi-antenna communication apparatus according to the third embodiment has the same structure as the multi-antenna communication apparatus according to the second embodiment except that the signal shaping section 100 is used, in the third embodiment, instead of the signal shaping section 60 and the first to the fourth switch control circuits 41 to 44. Further, a capacitor 77 via which the AD converter 72 is grounded at an input side thereof is additionally provided, and therefore the antenna selector switch and the sample-and-hold circuit are shared.

Figure 15:
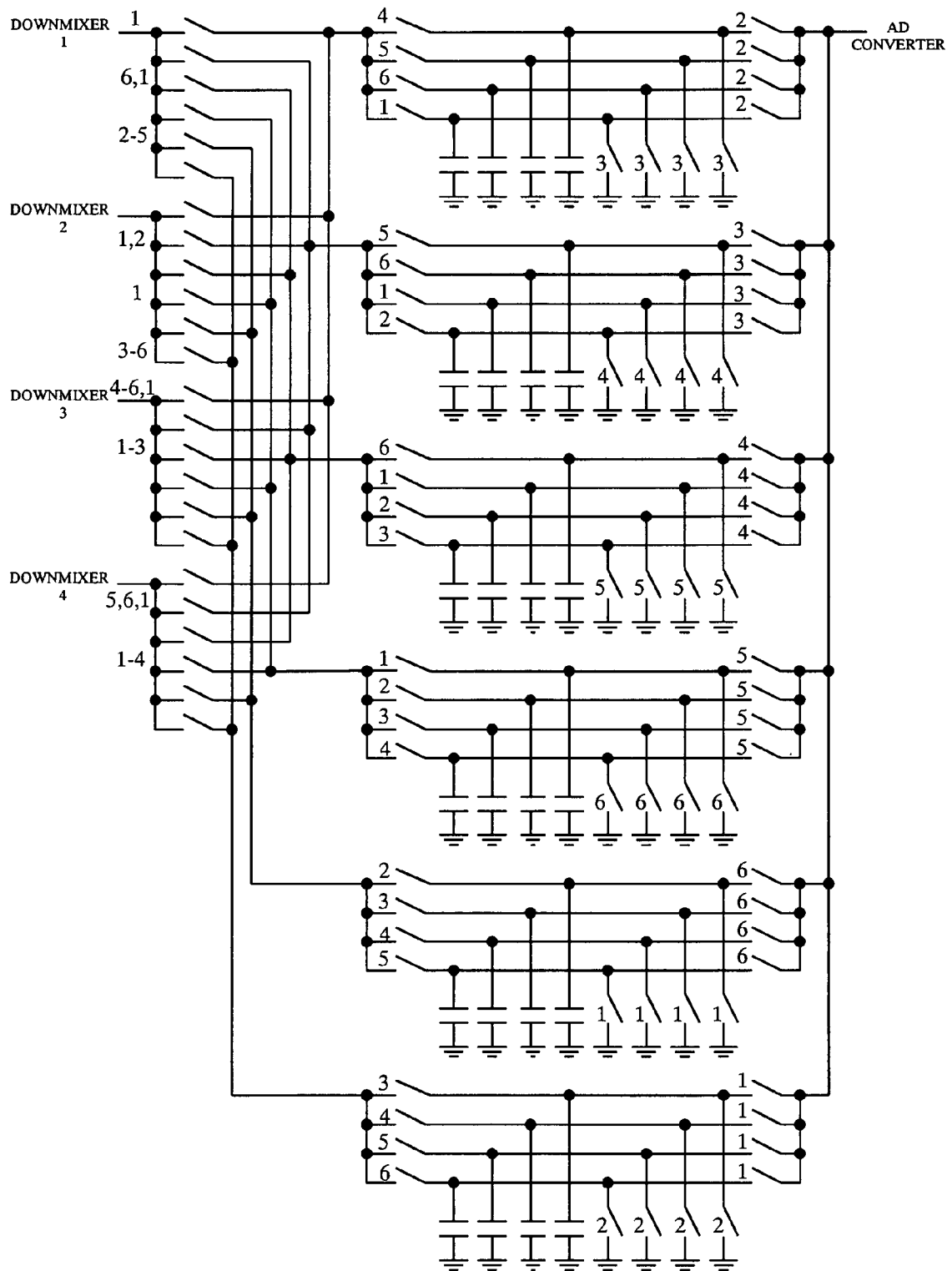
FIG. 15 is a diagram illustrating an exemplary circuit applicable to the multi-antenna communication apparatus according to the third embodiment of the present invention.

A circuit shown in FIG. 15 may be used instead of the baseband filter and the first to the fourth switches 31 to 34. The circuit shown in FIG. 15 is a modification of the discrete time filter shown in FIG. 12. The charge sampling filter is used in turn by the first to the fourth antennas 11 to 14 so as to pass the reception signals, and therefore the charge sampling filter, which typically requires eight parallel circuits, can be realized by using six parallel circuits (four circuits for sequentially subjecting four antenna reception signals to charge sampling repeatedly, one circuit used for outputting a signal, and one circuit used for resetting (discharging) a signal). Reference numerals 1 to 6 shown in FIG. 15 represent numbers of sampling time periods for which specific switches are ON, and a manner in which the respective switches are switched ON or OFF is similar to that described with reference to FIG. 12.

As described above, according to the third embodiment of the present invention, the downmixer and circuits following the downmixer may be shared, thereby realizing a multi-antenna communication apparatus having a reduced size.

FOURTH EMBODIMENT

The switching is sequentially performed for the four antennas repeatedly according to the first to the third embodiments described above (see FIG. 4). Desired waves received by the respective antennas may have different reception signal levels.

According to the fourth embodiment, switching for the reception signals are performed in the following manner.

For example, it is assumed that reception signal levels of the respective antennas or information representing bit error rates relating to the reception signal levels can be initially obtained from a result of demodulating preamble portions or pilot portions of the reception signals. Further, it is assumed that the reception signal levels of the first and the second antennas 11 and 12 are sufficiently high, the reception signal level of the third antenna 13 is too low to demodulate the reception signal, and the reception signal level of the fourth antenna 14 is low but the reception signal thereof can be demodulated when the AD converter performs over sampling using an increased sampling frequency and the quantization noise is reduced by $\Delta\Sigma$ modulation or the like.

Figure 16:
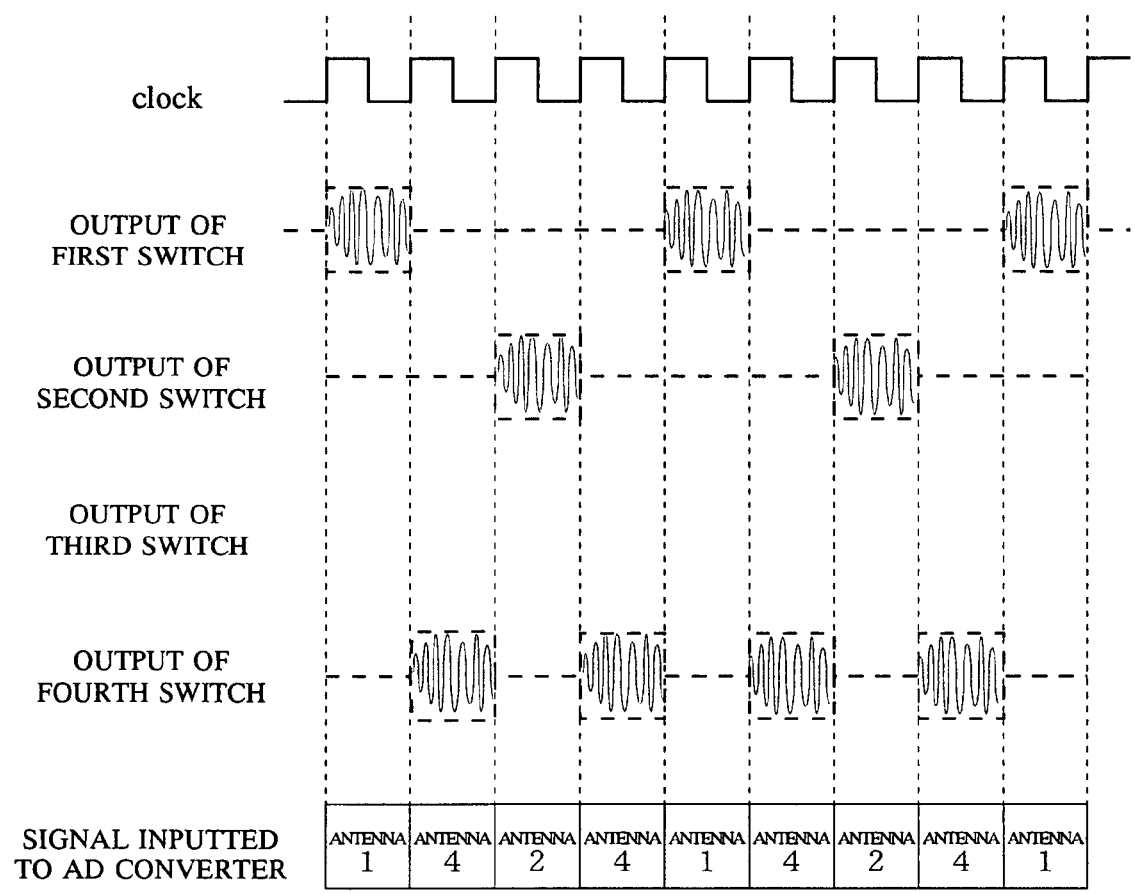
FIG. 16 is a diagram illustrating images of exemplary output waveforms of the first to the fourth switches 31 to 34 of a multi-antenna communication apparatus according to a fourth embodiment of the present invention.
Figure 17:
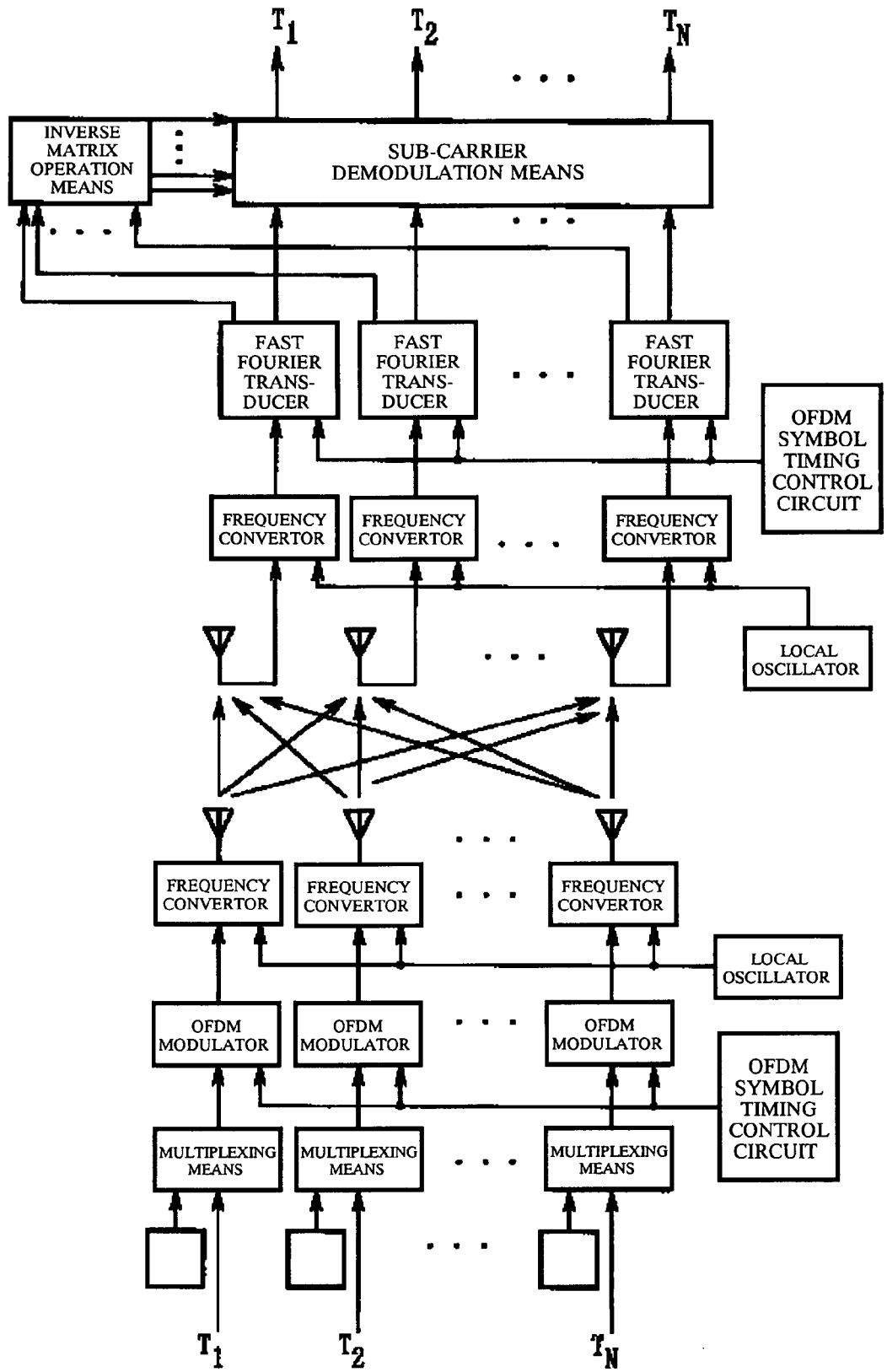
FIGS. 17 to 21 are diagrams each illustrating an exemplary structure of a conventional multi-antenna wireless device.
Figure 18:
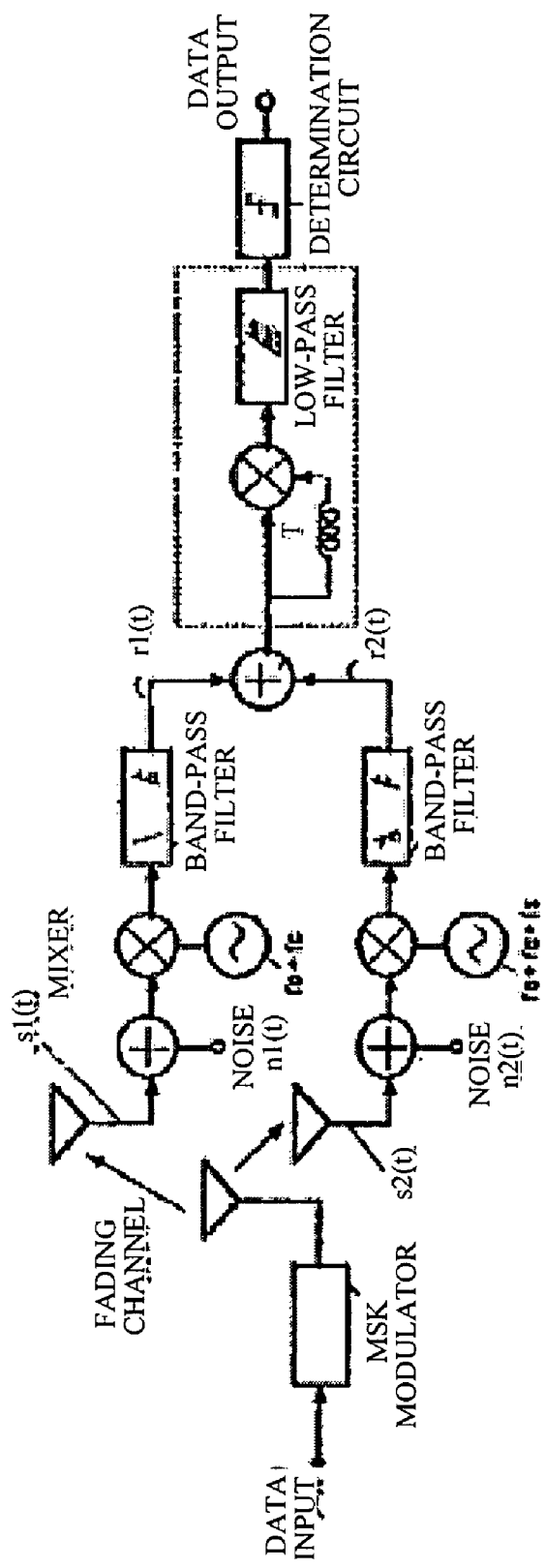
Figure 19:
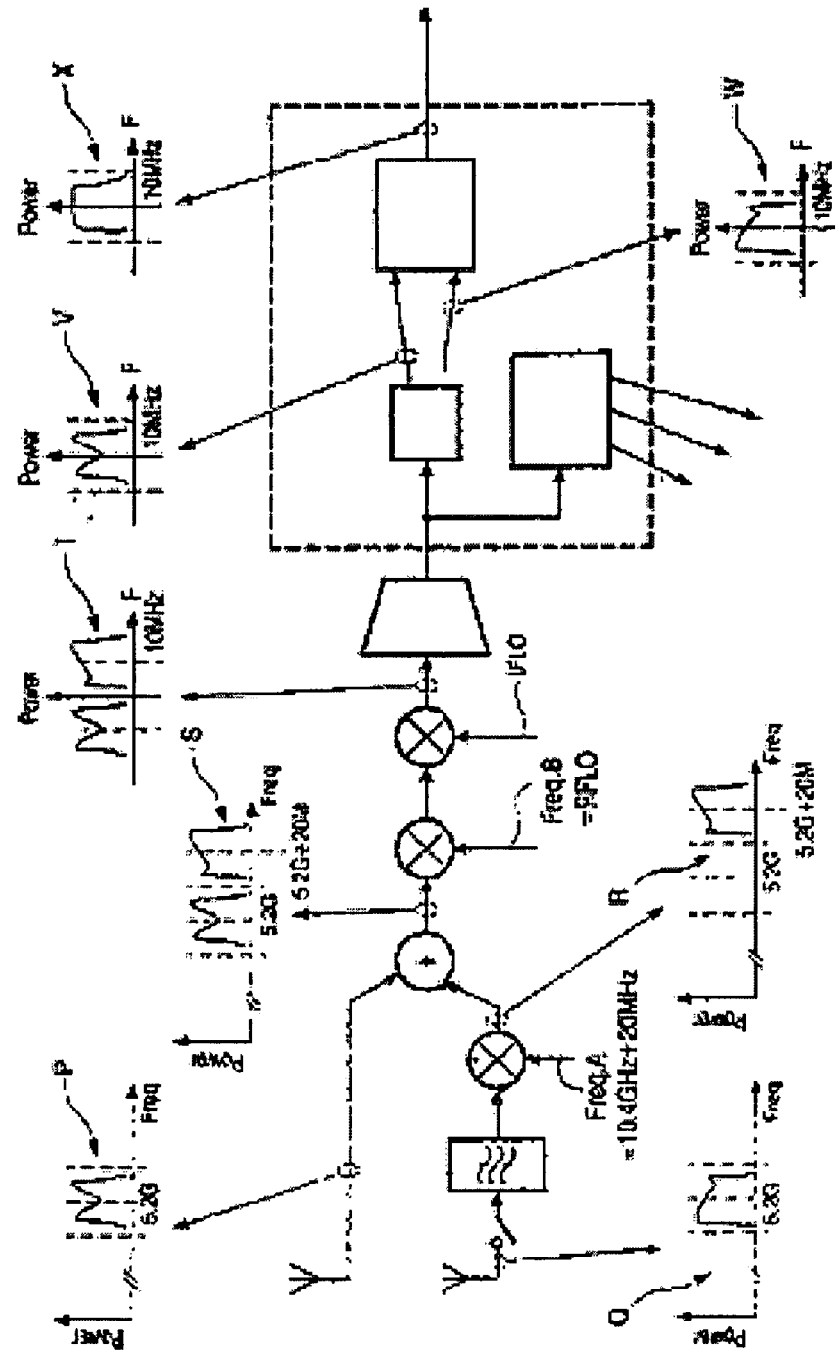
Figure 20:
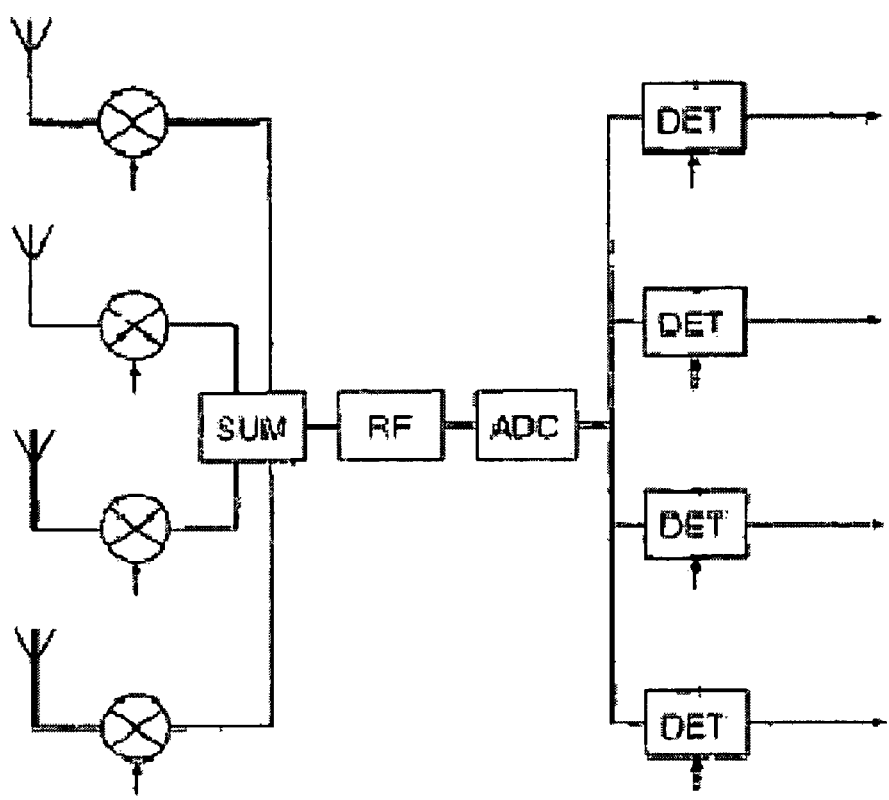
Figure 21:
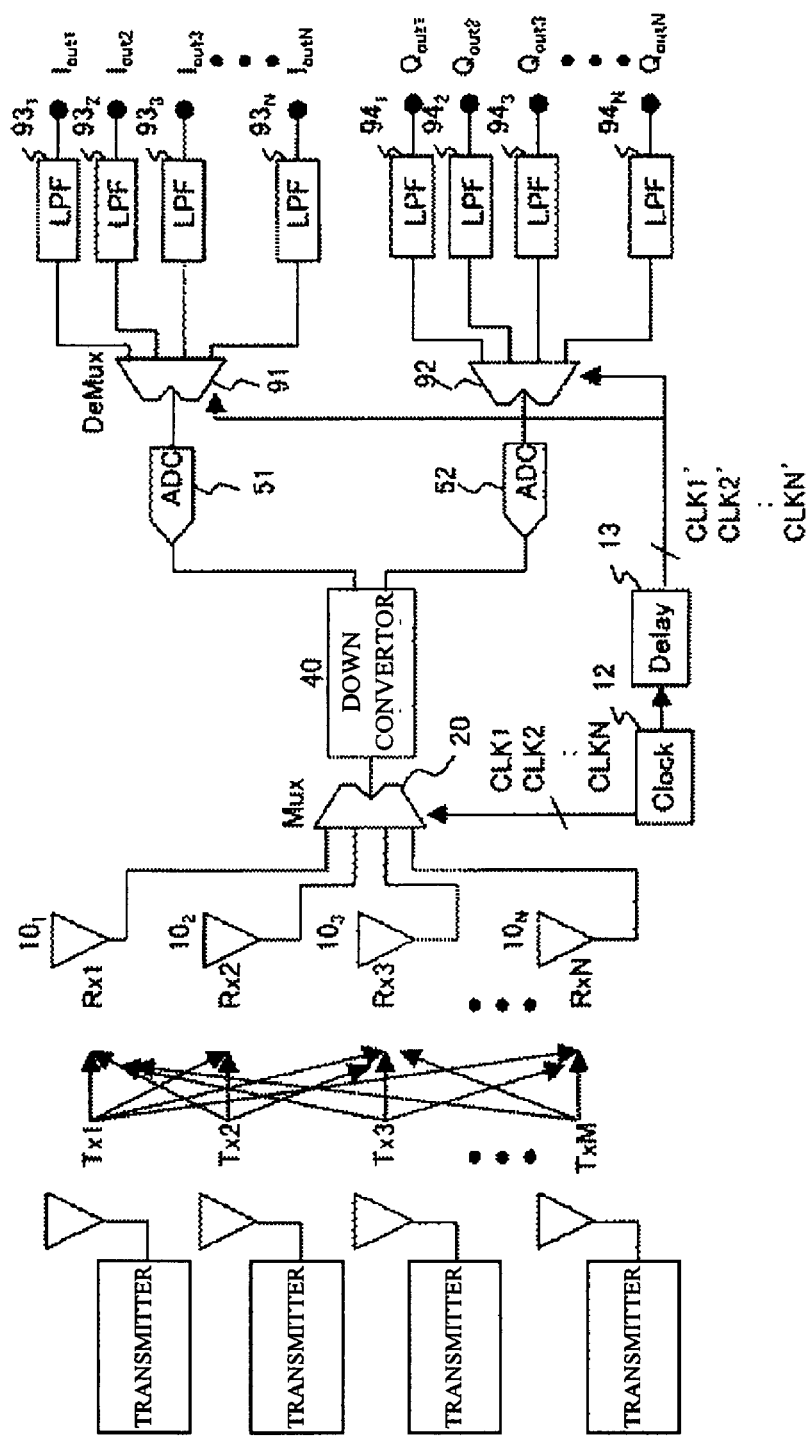

In this case, the demodulation of the reception signal of the third antenna 13 never contributes to entire enhancement of receiver sensitivity or entire enhancement of a transmission speed in the multi-antenna communication apparatus. On the other hand, when the AD converter performs over sampling using an increased sampling frequency, the fourth antenna 14 contributes to the entire enhancement of the receiver sensitivity or the entire enhancement of the transmission speed in the multi-antenna communication apparatus. Therefore, based on, for example, the reception signal levels of the respective antennas or information representing the bit error rates relating to the reception signal levels, which are obtained from a result of demodulating preamble portions or pilot portions of the reception signals, not the third switch 33 but the fourth switch 34 is turned ON when the third switch 33 is to be turned ON (see FIG. 16). Thus, the AD converter performs over sampling using the increased sampling frequency, so as to enable the reception signal of the fourth antenna 14 to be demodulated, thereby resulting in the entire enhancement of the receiver sensitivity or the entire enhancement of the transmission speed in the multi-antenna communication apparatus.

As described above, according to the fourth embodiment of the present invention, the switches are dynamically switched so as to optimally select, based on the reception signals of the respective antennas, a signal to be sampled, thereby entirely enhancing the receiver sensitivity or entirely enhancing the transmission speed in the multi-antenna communication apparatus While the invention has been described in detail, the foregoing description is in all aspects illustrative and not restrictive. It is understood that numerous other modifications and variations can be devised without departing from the scope of the invention.

What is claimed is:

1. A multi-antenna communication apparatus comprising a multi-antenna receiver for simultaneously receiving signals using a plurality of antennas, the multi-antenna communication apparatus comprising:
   N antennas;
   N switches operable to receive signals from the N antennas, respectively;
   a switch control circuit operable to repeatedly control the N switches so as to be ON, one by one, for a predetermined time period in a predetermined sequence, the switch control circuit including a reducing means for reducing a difference between any two voltage waveforms output from any two consecutive switches of the N switches;
   a signal shaping section operable to receive, as serial signals, reception signals outputted by the N switches in accordance with a control performed by the switch control circuit, and shape the serial signals;
   an AD converter operable to analog-to-digital convert, in synchronization with a time at which the switch control circuit performs the control, the serial signals having been shaped by the signal shaping section; and
   a serial-to-parallel conversion section operable to convert, into parallel signals, the serial signals having been digitalized by the AD converter, so as to generate, in the predetermined sequence, N signals corresponding to the N antennas.

2. The multi-antenna communication apparatus according to claim 1, wherein the signal shaping section downconverts the reception signals outputted by the N switches, and outputs the downconverted reception signals passed through a discrete time filter, to the AD converter.

3. The multi-antenna communication apparatus according to claim 1, wherein
   each of the N switches is a circuit in which either a plurality of FET switches each having a different size or a plurality of MEMS switches each having a different size are connected in parallel with each other, and
   the switch control circuit sequentially turns ON either the plurality of FET switches one by one or the plurality of MEMS switches one by one, and sequentially turns OFF either the plurality of FET switches one by one or the plurality of MEMS switches one by one such that the difference is reduced to a predetermined value at a discontinuous point.

4. The multi-antenna communication apparatus according to claim 1, wherein
   each of the N switches is a circuit in which either a plurality of FET switches serially connected to a plurality of attenuators, respectively, or a plurality of MEMS switches serially connected to the plurality of attenuators, respectively, are connected in parallel with each other, the plurality of attenuators having different attenuation amounts from each other, and
   the switch control circuit sequentially turns ON either the plurality of FET switches one by one or the plurality of MEMS switches one by one, and sequentially turns OFF either the plurality of FET switches one by one or the plurality of MEMS switches one by one such that the difference is reduced to a predetermined value at a discontinuous point.

5. The multi-antenna communication apparatus according to claim 1, wherein
   each of the N switches is a circuit in which either a plurality of FET switches having a same size or a plurality of MEMS switches having a same size are connected in parallel with each other, and
   the switch control circuit sequentially turns ON either the plurality of FET switches one by one or in combination or the plurality of MEMS switches one by one or in combination, and sequentially turns OFF either the plurality of FET switches one by one or in combination or the plurality of MEMS switches one by one or in combination such that the difference is reduced to a predetermined value at a discontinuous point.

6. The multi-antenna communication apparatus according to claim 5, wherein
   either the plurality of FET switches or the plurality of MEMS switches are turned ON one by one or in combination in a different sequence for each ON control, and either the plurality of FET switches or the plurality of MEMS switches are turned OFF one by one or in combination in a different sequence for each OFF control.

7. The multi-antenna communication apparatus according to claim 1, wherein
   each of the N switches is a circuit in which either a plurality of FET switches or a plurality of MEMS switches are connected in parallel with each other, and
   the switch control circuit turns the N switches ON and OFF using a $\Delta\Sigma$-modulated voltage so as to reduce the difference is reduced to a predetermined value at a discontinuous point.

8. The multi-antenna communication apparatus according to claim 1, wherein an output signal of the switch control circuit is waveform-shaped by using a Hamming window function.

9. The multi-antenna communication apparatus according to claim 1, wherein an output signal of the switch control circuit is waveform-shaped by using a Hanning window function.

10. The multi-antenna communication apparatus according to claim 1, wherein an output signal of the switch control circuit is waveform-shaped by using a Root Nyquist window function.

11. The multi-antenna communication apparatus according to claim 1, wherein the signal shaping section downconverts the reception signals outputted by the N switches, and outputs the downconverted reception signals to the AD converter.

12. The multi-antenna communication apparatus according to claim 1, wherein the AD converter performs a sampling at an intermediate time of the predetermined time period for which the switch control circuit performs ON control.

13. The multi-antenna communication apparatus according to claim 2, wherein the discrete time filter includes a charge sampling filter and a decimation filter combined with each other.

* * * * *